350-407 SR
XR 2,519,428
TX4050T

Aug. 22, 1950 C. A. BIRCH-FIELD 2,519,428

COLOR CONTROL SYSTEM FOR IMAGE PROJECTORS

Filed Feb. 8, 1946 2 Sheets-Sheet 1

INVENTOR
Charles A. Birch-Field
BY William A. Gluck
ATTORNEY

2519428

INVENTOR
Charles A. Birch-Field
BY [signature]
ATTORNEY

Patented Aug. 22, 1950

2,519,428

UNITED STATES PATENT OFFICE 2,519,428

COLOR CONTROL SYSTEM FOR IMAGE PROJECTORS

Charles A. Birch-Field, New York, N. Y.

Application February 8, 1946, Serial No. 646,270

5 Claims. (Cl. 88—24)

This invention relates to apparatus for selectively controlling the color values of a projected image. All color in nature, except the pure primary colors, consist of the three primary colors, red, green, and blue, mixed in varied proportions. A variation of the proportions of the three primary colors in a light ray reflected from or transmitted through an object point (which object point may be white or colored) will change the color values in the light beam, so that the color of the projected image of the object point may be selectively varied from the original color (including white) of the object point.

The principal object of this invention is to provide apparatus for selectively varying the proportions of the three primary colors in the light ray of an object point for the purpose of selectively altering the color of the projected image of that object point. The selective variation of the proportions of the three primary colors may be achieved either by controlling the percentage of one of the primary colors, say, red, since this will of course change the relative percentage of all three components, or by controlling the percentage of any one or any two or all of the three primary colors. An allied object is to provide apparatus for controlling the percentage of a particular one of the three primary colors. A further allied object is to provide apparatus in which any one, any two, or all of the three primary colors may be controlled.

If the object points originate from a black and white transparency, it will thus be seen that the selective variation of the three primary colors will cause the projected images of the object points to be colored. A further object of the invention is to provide apparatus for selectively altering the color values of an image projected from a black and white transparency.

For the attainment of these and such other objects as may appear or be pointed out herein, I have shown an embodiment of my invention in the accompanying drawing, wherein.

Figure 7:
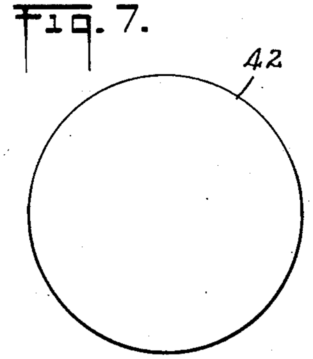
Figures 8, 9:
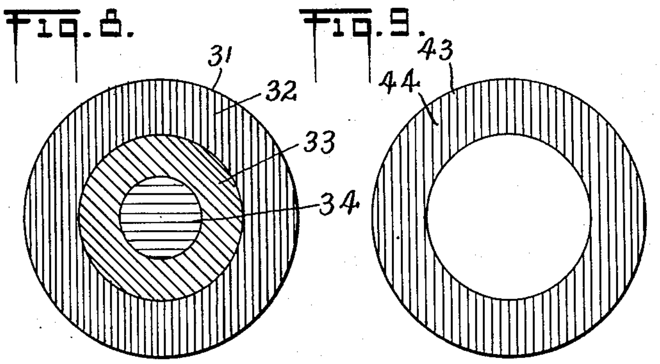
Figure 10:
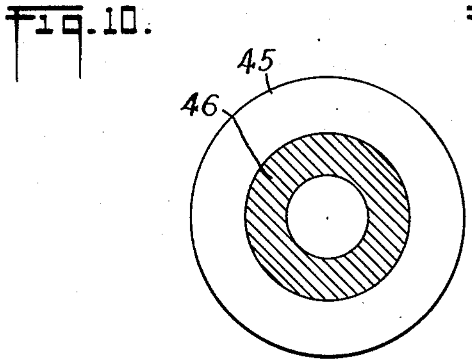
Figure 11:
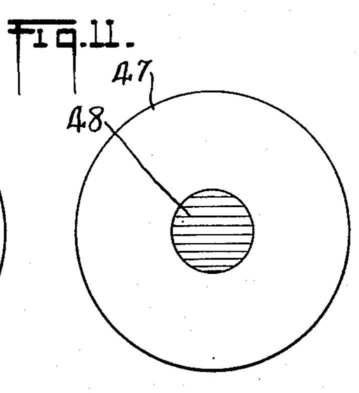

Fig. 7 is a front view of the polarizing plate; Fig. 8 is a front view of the transparent color member; Figs. 9, 10, and 11 are front views of the three analyzing plates employed in the apparatus of Fig. 5.

Figures 1, 2, 3, 4:
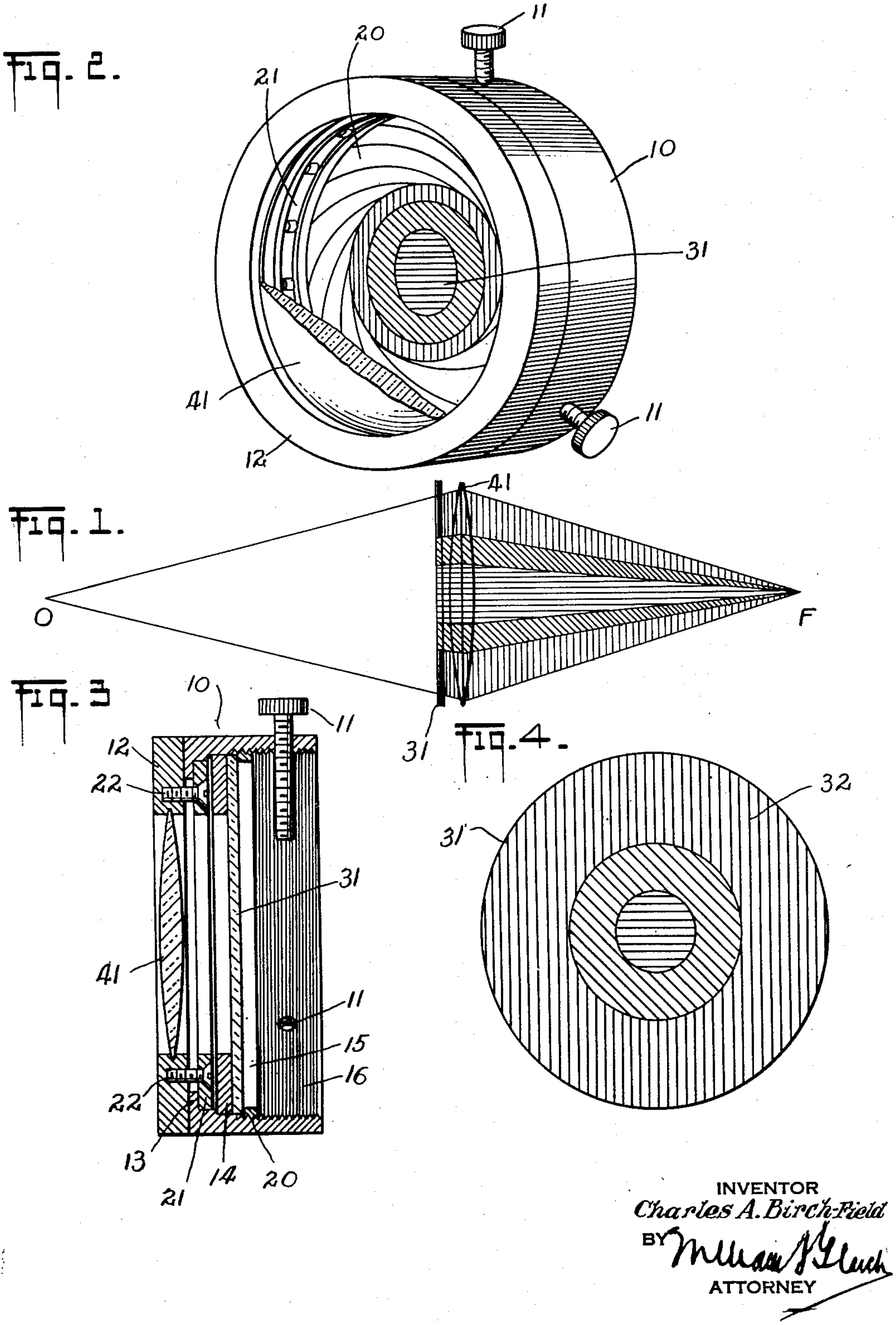
Fig. 1 is a diagrammatic illustration of the principles underlying my invention.
Fig. 2 is a perspective view of the apparatus in which a particular one of the three primary colors is controlled.
Fig. 3 is a sectional elevation of the apparatus of Fig. 1.
Fig. 4 is a front view of the transparent color member employed in the apparatus.

Referring to Fig. 1, O represents an object point, and 31 represents a transparent color member, consisting of a blue center area surrounded by two concentric annular areas of green (adjacent to center blue area) and red (outer), see Fig. 4. The rays of light reflected from or transmitted through the object point O consist of a mixture of various colored rays, their proportions being determined by the color of the object point. The color member 31 separates the mixture into its primary components and when the separated components are recombined at the focal plane of a lens 41 through which they are directed, as at F, the point of light at F will be of the same color as the object point at O. If, however, the area of one of the colors of the color member is changed, the color of the point at F will be altered in a degree determined by the change in the color member area. Each and every color point of an image transmitted through this combination of color member and lens can be altered simultaneously thus making possible the modification of the color balance and character of the image at the focal plane.

I have found it convenient to control the area of the red component of the primary colors and the apparatus of Figs. 2–3 is arranged in this manner, although it will be evident that the apparatus may be arranged to control the area of any one of the three components. The transparent color member 31 and the lens 41 (diagrammatically illustrated in Fig. 1) are held in a tubular casing 10, Figs. 2–3, together with an iris diaphragm consisting of a stationary member 20 and a rotatable member 21. Casing 10, which is mounted in position by set screws 11, has a ring member 12 mounted at one end thereof for a limited extent of rotation. The lens 41 is mounted in ring member 12, to which is secured, as by screws 22, the rotatable member 21 of the iris diaphragm, so that by rotating ring member 12 the iris diaphragm may be adjusted to selectively vary the area of the outer concentric band 32 of the transparent color member 31 (see Fig. 4) presented to the light rays from the object. As shown in Fig. 4, the outer concentric band 32 is the red component area of the three primary colors, since red has the longest wave length of the three. Referring to Fig. 3, the rotative member 21 of the iris diaphragm is held in place by a flange 13 integral with casing 10 and interposed between member 21 and ring member 12; the stationary member 20 of the iris diaphragm is maintained in spaced relation to its companion member 21 by a ledge 14 in the casing. The transparent color member 31, which abuts the diaphragm member 20 is held in place by a ferrule 15 screwed into the threaded inside wall 16 of the casing.

It was stated above that, instead of controlling one particular color, say, red (as in Figs. 2–3), any one, any two, or all of the three primary colors may be controlled. This form of my invention is shown in Figs. 5 to 11, the circular members shown in Figs. 7 to 11 thereof being component parts which are held in a tubular casing 17, Figs. 5 and 6. These component parts are, starting at the left end, Fig. 6, of the casing: a polarizing disc 42, Fig. 7, effective over its entire area to polarize light entering at the left opening, Fig. 7, of the casing; the transparent color member 31, Fig. 8, similar to the one employed in the apparatus of Figs. 2–4 and in the diagrammatic illustration of Fig. 1; and analyzing disc 43, Fig. 9, effective to polarize light at the outer concentric band 44, which corresponds to the outer red concentric band 32 of the color member 31, Fig. 8; a second analyzing disc 45, Fig. 10, effective to polarize light at the inner concentric band 46, which corresponds to the inner green concentric band 33 of color member 31; and a third analyzing disc 47, Fig. 10, effective to polarize light at its center area 48, which corresponds to the center blue area 34 of color member 31. The component disc members 42, 31, 43, 45, 47, are held against a flange 18 of the casing 17 by a ferrule 19 screwed into the threaded inside wall 26 of the casing, and are separated by rings 24. The three analyzing discs 43, 45 and 47 are provided with finger-pieces, respectively, 53, 55 and 57, which clear through slots in casing, respectively, 23, 25 and 27, and are thus accessible for selectively turning the respective analyzing discs. The casing is mounted in position as by set screws 28.

When the polarity axes of the three analyzing discs 43, 45, 47 are parallel to the polarity axis of the polarizing disc 42, the relative percentage of the three primary colors will not be varied from the percentage as fixed by the transparent color member 31, inasmuch as the polarizing discs do not obdurate any of the light in this position; hence in this position of the analyzing discs, the color of the image will be the same as that of the object point. But if any one of the three analyzing discs, or if any two of them, or all three discs are turned to position the polarity axis of the respective discs at an angle to the polarity axis of the polarizing disc 42, this will cut down the amount of the particular color component transmitted through the turned analyzing disc depending upon the extent it had been turned; hence the relative percentage of the three primary colors may be selectively varied by turning their respective analyzing discs.

Figures 5, 6:
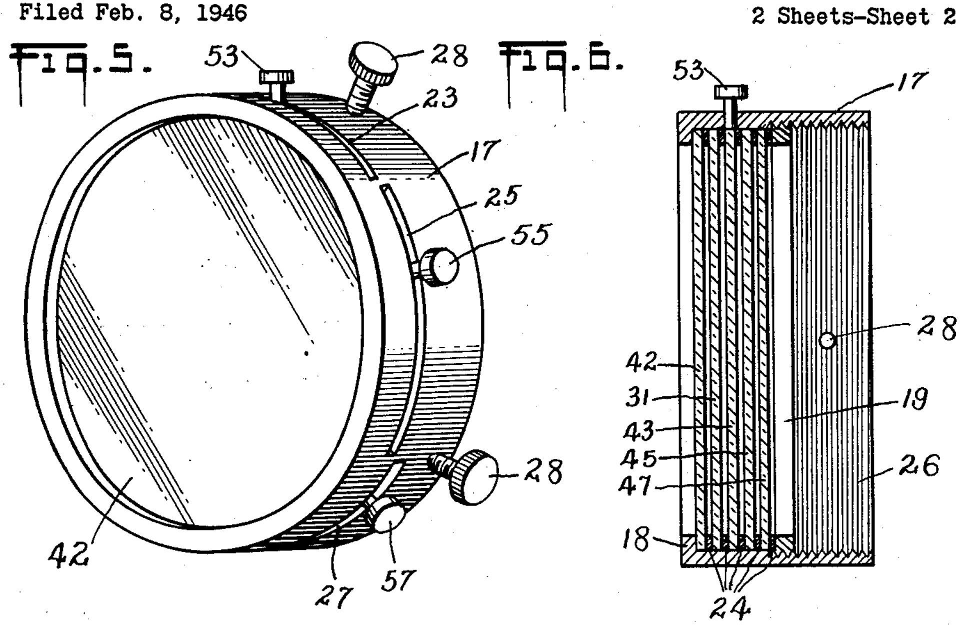
Fig. 5 is a perspective view of the apparatus in which any one, any two, or all of the three primary colors may be controlled.
Fig. 6 is a sectional elevation of the apparatus of Fig. 5.

The apparatus of Figs. 5–6 may be implemented with less than three analyzing discs. It may have, for instance, only a single analyzing disc, in which case it will be similar to the apparatus of Figs. 2–3 in that the percentage of a particular one of the primary colors is selectively controlled; this similarity will be closer if the single disc is the analyzing disc 43, Fig. 9, having an outer concentric red filter, thus corresponding to the iris diaphragm of the apparatus of Figs. 2–3.

I claim:

1. A system for controlling the color of an image projected from an object point, in combination, a projection lens for focussing the light ray originating at said object point, the said light ray being composed of the three primary colors in proportions depending upon the color of the object point, a transparent color member disposed close to the said lens and presenting an outer concentric red filter band, an inner concentric green filter band and a center blue filter area, and an iris diaphragm associated with the said outer concentric red filter band and adapted to selectively vary the area thereof presented to the light ray from the object point whereby the relative areas of all three filters is changed to selectively control the color of the projected image focused by the said lens.

2. A system for selectively controlling the color of a directed light beam, in combination, a light source originating the said light beam, the said light beam being composed of the three primary colors in proportions depending upon the color of the light beam originating at the said light source, a transparent color member disposed in front of the said light source and presenting an outer concentric red filter band, an inner concentric green filter band, and a center blue filter area, and an iris diaphragm associated with the said outer concentric red filter band and adapted to selectively vary the area thereof presented to the light beam from the said light source whereby the relative areas of all three filters is changed to selectively control the color of the directed beam.

3. A system for controlling the color of an image projected from an object point, in combination, a projection lens for focusing the light ray originating at said object point, the said light ray being composed of the three primary colors in proportions depending upon the color of the object point, a transparent color member disposed close to the said lens and presenting an outer concentric red filter band, an inner concentric green filter band and a center blue filter area, a polarizing disc disposed in front of one face of the said color member, an analyzing disc having an outer concentric analyzing band corresponding to the said outer concentric red filter band of the color member, a second analyzing disc having an inner concentric analyzing band corresponding to the said inner concentric green filter band of the color member, and a third analyzing disc having a center analyzing area corresponding to the said center blue filter area of the color member, the said analyzing discs being disposed in front of the other face of the color member, the said analyzing discs being selectively turned to change the angular relationship between the polarity axes of the respective analyzing discs and the polarity angle of the said polarizing disc to vary the percentage of the three primary colors transmitted through the analyzing discs for selectively controlling the color of the projected image focused by the said lens.

4. A system for controlling the color of an image projected from an object point, in combination, a projection lens for focusing the light ray originating at said object point, the said light ray being composed of the three primary colors in proportions depending upon the color of the object point, a transparent color member disposed close to the said lens and presenting an outer concentric red filter band, an inner concentric green filter band and a center blue filter area, a polarizing disc disposed in front of one face of the said color member, and an analyzing disc disposed in front of the other face of the color member and having an analyzing area dimensionally and positionally corresponding to one of the said three filter areas of the color member, the said analyzing disc being selectively turned to change the angular relationship between its polarity axis and the polarity axis of the said polarizing disc to vary the percentage of the particular color transmitted through the analyzing disc for selectively controlling the color of the projected image focused by the said lens.

5. A system for selectively controlling the color of a directed light beam, in combination, a light source originating the said light beam, the said light beam being composed of the three primary colors in proportions depending upon the color of the light beam originating at the said light source, a transparent color member disposed in front of the said light source and presenting an outer concentric red filter band, an inner concentric green filter band and a center blue filter area, a polarizing disc disposed in front of one face of the said color member, an analyzing disc having an outer concentric analyzing band corresponding to the said outer concentric red filter band of the color member, a second analyzing disc having an inner concentric analyzing band corresponding to the said inner concentric green filter band of the color member, and a third analyzing disc having a center analyzing area corresponding to the said center blue filter area of the color member, the said analyzing discs being disposed in front of the other face of the color member, the said analyzing discs being selectively turned to change the angular relationship between the polarity axes of the respective analyzing discs and the polarity angle of the said polarizing disc to vary the percentage of the three primary colors transmitted through the analyzing discs for selectively controlling the color of the directed light beam.

CHARLES A. BIRCH-FIELD.

REFERENCES CITED

The following references are of record in the file of this patent:

UNITED STATES PATENTS

| Number | Name | Date |
|---|---|---|
| 432,530 | Ives | July 22, 1890 |
| 562,642 | McDonough | June 23, 1896 |
| 599,670 | Harrison | Feb. 22, 1898 |
| 887,839 | Patterson | May 19, 1908 |
| 926,523 | Wandersleb | June 29, 1909 |
| 1,172,628 | Partington | Feb. 22, 1916 |
| 1,340,923 | Underhill | May 25, 1920 |
| 1,353,151 | Deming | Sept. 21, 1920 |
| 1,626,841 | Kelley et al. | May 3, 1927 |
| 1,873,758 | Ginsberg | Aug. 23, 1932 |
| 1,971,434 | Trautmann | Aug. 28, 1934 |
| 2,064,812 | Bonchard | Dec. 22, 1936 |
| 2,184,138 | Corey | Dec. 19, 1939 |
| 2,207,411 | Pierce | July 9, 1940 |
| 2,221,037 | Yule | Nov. 12, 1940 |

FOREIGN PATENTS

| Number | Country | Date |
|---|---|---|
| 483,500 | Great Britain | Apr. 21, 1938 |